United States Patent
Otsuki et al.

(10) Patent No.: US 8,350,514 B2
(45) Date of Patent: Jan. 8, 2013

(54) NUMERICAL CONTROLLER FOR MULTI-AXIS MACHINE

(75) Inventors: Toshiaki Otsuki, Minamitsuru-gun (JP); Soichiro Ide, Minamitsuru-gun (JP); Osamu Hanaoka, Minamitsuru-gun (JP); Takafumi Sasaki, Minamitsuru-gun (JP)

(73) Assignee: Fanuc Corporation, Minamitsuru-gun, Yamanashi (JP)

( * ) Notice: Subject to any disclaimer, the term of this patent is extended or adjusted under 35 U.S.C. 154(b) by 74 days.

(21) Appl. No.: 13/097,795

(22) Filed: Apr. 29, 2011

(65) Prior Publication Data

US 2012/0001583 A1   Jan. 5, 2012

(30) Foreign Application Priority Data

Jun. 30, 2010   (JP) .................. 2010-148969

(51) Int. Cl.
G05B 19/25 (2006.01)

(52) U.S. Cl. .................. 318/573; 318/569; 318/568.15; 318/568.22; 700/186; 700/260

(58) Field of Classification Search .................. 318/569, 318/807, 568.15, 568.22, 573; 700/180, 700/260
See application file for complete search history.

(56) References Cited

U.S. PATENT DOCUMENTS

| | | | |
|---|---|---|---|
| 4,591,771 A | | 5/1986 | Nozawa et al. |
| 5,465,215 A * | | 11/1995 | Strickland et al. ............ 700/180 |
| 5,565,752 A * | | 10/1996 | Jansen et al. .................. 318/807 |
| 5,585,709 A * | | 12/1996 | Jansen et al. .................. 318/807 |
| 5,751,585 A * | | 5/1998 | Cutler et al. .................. 700/161 |
| 5,807,284 A * | | 9/1998 | Foxlin .......................... 600/595 |
| 5,834,623 A * | | 11/1998 | Ignagni ........................ 702/105 |
| 6,162,191 A * | | 12/2000 | Foxlin .......................... 600/595 |
| 6,170,622 B1 * | | 1/2001 | Wakui et al. .................. 188/378 |
| 6,400,998 B1 * | | 6/2002 | Yamazaki et al. .............. 700/86 |
| 6,430,465 B2 * | | 8/2002 | Cutler .......................... 700/193 |
| 6,775,586 B2 | | 8/2004 | Shibata et al. |
| 7,283,889 B2 | | 10/2007 | Otsuki et al. |
| 7,869,897 B2 * | | 1/2011 | Otsuki et al. .................. 700/189 |
| 8,185,243 B2 * | | 5/2012 | Okazaki ........................ 700/260 |
| 8,260,453 B2 * | | 9/2012 | Otsuki et al. .................. 700/189 |
| 2008/0091296 A1 * | | 4/2008 | Zacek et al. .................. 700/186 |
| 2009/0105880 A1 * | | 4/2009 | Okazaki ........................ 700/258 |
| 2009/0140684 A1 | | 6/2009 | Otsuki et al. |
| 2010/0244762 A1 | | 9/2010 | Mori et al. |
| 2011/0218676 A1 * | | 9/2011 | Okazaki ........................ 700/260 |
| 2011/0218780 A1 * | | 9/2011 | Yang et al. .................... 703/2 |

FOREIGN PATENT DOCUMENTS

JP    62-46002    9/1987

(Continued)

*Primary Examiner* — Paul Ip
(74) *Attorney, Agent, or Firm* — Drinker Biddle & Reath LLP

(57) ABSTRACT

A numerical controller for controlling a multi-axis machine calculates an axis-dependent translation error amount and an axis-dependent rotation error amount based on a command axis position. Translation and rotation compensation amounts are calculated based on the axis dependent translation and rotation error amounts, respectively. The translation and rotation compensation amounts are added to command linear and rotary axis positions, respectively. Three linear axes and three rotary axes are driven to the added positions, individually. Thus, there is provided a numerical controller that enables even machining with a side face of a tool or boring to be in commanded tool position and posture (orientation) in the multi-axis machine.

10 Claims, 11 Drawing Sheets

| MOVING BODY | AXIS POSITION TO DEPEND | ERROR | |
|---|---|---|---|
| TOOL HEAD | LINEAR AXIS POSITION | ROTATION ERROR | TRANSLATION ERROR |
| | ROTARY AXIS POSITION | ROTATION ERROR | TRANSLATION ERROR |
| TABLE | LINEAR AXIS POSITION | ROTATION ERROR | TRANSLATION ERROR |
| | ROTARY AXIS POSITION | ROTATION ERROR | TRANSLATION ERROR |

FOREIGN PATENT DOCUMENTS

| | | |
|---|---|---|
| JP | 5-100723 A | 4/1993 |
| JP | 2002-215211 A | 7/2002 |
| JP | 2003-195917 A | 7/2003 |
| JP | 4038185 B2 | 11/2007 |
| JP | 2008-269316 A | 11/2008 |
| JP | 2009-009274 A | 1/2009 |
| JP | 2009-151756 | 7/2009 |
| JP | 2010-105117 A | 5/2010 |
| WO | WO-2009057229 A1 | 5/2009 |

* cited by examiner

| MOVING BODY | AXIS POSITION TO DEPEND | ERROR | |
|---|---|---|---|
| TOOL HEAD | LINEAR AXIS POSITION | ROTATION ERROR | TRANSLATION ERROR |
| | ROTARY AXIS POSITION | ROTATION ERROR | TRANSLATION ERROR |
| TABLE | LINEAR AXIS POSITION | ROTATION ERROR | TRANSLATION ERROR |
| | ROTARY AXIS POSITION | ROTATION ERROR | TRANSLATION ERROR |

```
G43. 4 H__ ;
X__ Y__ Z__ A__ B__ C__ ;
X__ Y__ Z__ A__ B__ C__ ;
...
G49 ;
```

| MOVING BODY | AXIS POSITION TO DEPEND | ERROR | | | | ERROR DATA |
|---|---|---|---|---|---|---|
| | | ROTATION ERROR MATRIX (r) | | TRANSLATION ERROR VECTOR (t) | | |
| TOOL HEAD (h) | LINEAR AXIS POSITION (l) | Mhr | Mhlr | Mht | Mhlt | Dhl |
| | ROTARY AXIS POSITION (r) | | Mhrr | | Mhrt | Dhr |
| TABLE (t) | LINEAR AXIS POSITION (l) | Mtr | Mtlr | Mtt | Mtlt | Dtl |
| | ROTARY AXIS POSITION (r) | | Mtrr | | Mtrt | Dtr |

FIG.17

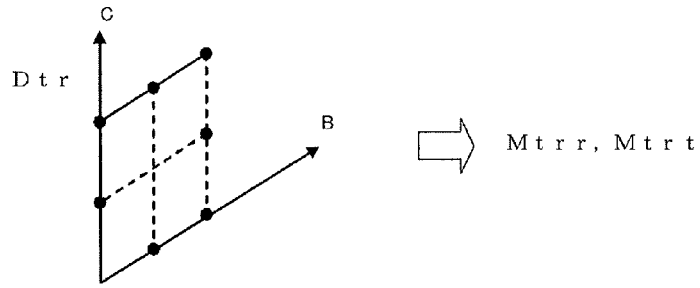

FIG.18

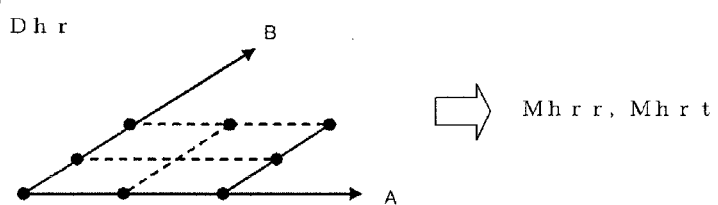

FIG.19

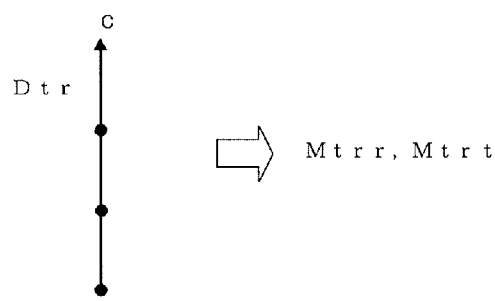

FIG.20

| CONDITIONS | | | | | | | | | |
|---|---|---|---|---|---|---|---|---|---|
| AXIAL POSITION | | ROTATION ERROR AMOUNT (RADIAN) OF TOOL HEAD LINEAR AXIS | | TRANSLATION ERROR AMOUNT (mm) OF TOOL HEAD LINEAR AXIS | | ROTATION ERROR AMOUNT (RADIAN) OF TOOL HEAD ROTARY AXIS | | TRANSLATION ERROR AMOUNT (mm) OF TOOL HEAD ROTARY AXIS | TOOL LENGTH COMPENSATION AMOUNT (mm) |
| A (DEG.) | 60 | eIhl | -0.0001 | eXhl | -0.002 | eIhr | -0.0001 | eXhr | 0.011 | 10 |
| B (DEG.) | 45 | eJhl | 0.00025 | eYhl | 0.012 | eJhr | 0.0002 | eYhr | 0.007 | |
| C (DEG.) | 110 | eKhl | 0.0001 | eZhl | 0.009 | eKhr | 0.0002 | eZhr | -0.012 | |

| COMPENSATION | | | |
|---|---|---|---|
| ROTATION COMPENSATION AMOUNT $\Delta Cr$ | | TRANSLATION COMPENSATION AMOUNT $\Delta Ct$ | |
| $\Delta A$ (DEG.) | -0.0077 | $\Delta X$ (mm) | -0.009 |
| $\Delta B$ (DEG.) | -0.0575 | $\Delta Y$ (mm) | -0.019 |
| $\Delta C$ (DEG.) | 0 | $\Delta Z$ (mm) | 0.003 |

FIG.21

| CONDITIONS | | | | | | | | | |
|---|---|---|---|---|---|---|---|---|---|
| AXIAL POSITION | | ROTATION ERROR AMOUNT (RADIAN) OF TOOL HEAD LINEAR AXIS | | TRANSLATION ERROR AMOUNT (mm) OF TOOL HEAD LINEAR AXIS | | ROTATION ERROR AMOUNT (RADIAN) OF TABLE ROTARY AXIS | | TRANSLATION ERROR AMOUNT (mm) OF TABLE ROTARY AXIS | TOOL LENGTH COMPENSATION AMOUNT (mm) |
| A (DEG.) | 25 | eIhl | −0.0001 | eXhl | −0.002 | eItr | −0.0004 | eXtr | 0.011 | 10 |
| B (DEG.) | 60 | eJhl | 0.00035 | eYhl | 0.012 | eJtr | 0.0005 | eYtr | 0.007 | |
| C (DEG.) | 245 | eKhl | 0.0001 | eZhl | 0.009 | eKtr | 0.0006 | eZtr | −0.012 | |

| COMPENSATION | | | |
|---|---|---|---|
| ROTATION COMPENSATION AMOUNT ΔCr | | TRANSLATION COMPENSATION AMOUNT ΔCt | |
| ΔA (DEG.) | 0.0090 | ΔX(mm) | 0.0156 |
| ΔB (DEG.) | 0.0203 | ΔY(mm) | −0.4351 |
| ΔC (DEG.) | 0 | ΔZ(mm) | 0.2808 |

NUMERICAL CONTROLLER FOR MULTI-AXIS MACHINE

RELATED APPLICATION DATA

This application claims priority under 35 U.S.C. §119 and/or §365 to Japanese Application No. 2010-148969 filed Jun. 30, 2010, the entire contents of which is incorporated herein by reference.

BACKGROUND OF THE INVENTION

1. Field of the Invention

The present invention relates to a numerical controller for controlling a multi-axis machine having at least three linear axes and three rotary axes. More particularly, the invention relates to a numerical controller configured to perform compensations corresponding to table linear-axis translation and rotation errors dependent on a linear axis position for table drive, table rotary-axis translation and rotation errors dependent on a rotary axis position for table drive, tool head linear-axis translation and rotation errors dependent on a linear axis position for tool head drive, and tool head rotary-axis translation and rotation errors dependent on a rotary axis position for tool head drive, thereby moving a tool center point to an error-free position and moving the tool posture (orientation) to an error-free tool posture and ensures control for high-precision machining.

2. Description of the Related Art

Japanese Patent Application Laid-Open No. 2009-151756 (Also published as US2009/0140684A1, hereinafter referred to as the patent document) discloses a technique for a numerical controller for controlling a five-axis machine having three linear axes and two rotary axes. According to this technique, a linear-axis coordinate space and a rotary-axis coordinate space are each divided into lattice-like regions, lattice point compensation vectors are stored at lattice points, axis-dependent translation and rotation compensation amounts are calculated from linear and rotary axis positions, based on the lattice point compensation vectors, and a tool center point is moved to an error-free position by compensating the linear axis position.

According to the patent document described above, only the linear axis position is compensated. Thus, although the tool center point is moved to the error-free position, the tool posture (orientation) remains erroneous.

If the tool center point is used for machining, the above-described prior art compensation involves no problem. However, if a side face of a tool is used for machining or in the case of boring in which machining is directed toward the tool, the tool posture (orientation) is an important factor, and simple compensation of the tool center point position to an error-free position is not enough. Thus, according to the prior art disclosed in the above patent document, high-precision machining cannot be achieved if there is any error attributable to a machine system during the boring or machining with the side face of the tool.

Further, the object of the technique disclosed in the above-described patent document is the five-axis machine having three linear axes and two rotary axes. Five-axis machines can be roughly classified into three types, a tool-head-rotation type, table-rotation type, and mixed type (in which both a tool head and a table are rotatable). In the five-axis machines of the table-rotation type and mixed type, the rotary axes cannot always be controlled so as to compensate an error, if any, in the tool posture (orientation) relative to a workpiece.

In the above-described patent document, moreover, the main possible errors are described as including (1) a linear-axis-dependent translation error that depends on the linear axis position, (2) a rotary-axis-dependent translation error that depends on the rotary axis position, (3) a linear-axis-dependent rotation error that depends on the linear axis position, and (4) a rotary-axis-dependent rotation error that depends on the rotary axis position.

However, the main errors derive from a moving body. In general, a moving body in a machine tool is a tool head or a table. Normally, a rotary moving body lies on a linear moving body. Therefore, an error in the rotary tool head depends on the position of a rotary axis about which the tool head is rotated and that of a linear axis on which the tool head lies. On the other hand, an error in the rotary table depends on the position of a rotary axis about which the table is rotated and that of a linear axis on which the table lies. Thus, the four error categories disclosed in the above-described patent document are given in a simplified form, and the errors should be originally classified into eight categories, as shown in FIG. 1.

SUMMARY OF THE INVENTION

Accordingly, the present invention is configured so that a translation compensation amount is obtained from error amounts set in association with the above eight errors, the obtained translation compensation amount is added to a command linear axis position, a rotation compensation amount is obtained, and the obtained rotation compensation amount is added to a command rotary axis position. Thus, the object of the invention is to provide a numerical controller for controlling a multi-axis machine, configured to perform compensation such that a tool center point is moved to an error-free position and the tool posture (orientation) is also moved to an error-free orientation to ensure control for high-precision machining. In other words, the object of the invention is to provide a numerical controller that enables even machining with a side face of a tool or boring to be in commanded tool position and posture (orientation) in the multi-axis machine.

The present invention relates to a numerical controller for controlling a multi-axis machine which uses at least three linear axes and three rotary axes to machine a workpiece mounted on a table. The numerical controller comprises axis-dependent error amount calculation means for calculating an axis-dependent translation error amount and an axis-dependent rotation error amount based on a command axis position, translation compensation amount calculation means for calculating a translation compensation amount based on the axis-dependent translation error amount, rotation compensation amount calculation means for calculating a rotation compensation amount based on the axis-dependent rotation error amount, compensation amount adding means for adding the translation compensation amount to a command linear axis position and adding the rotation compensation amount to a command rotary axis position, and means for driving the three linear axes and the three rotary axes to a position calculated by the compensation amount adding means.

The axis-dependent error amount calculation means may calculate a rotary-axis-dependent translation error amount and a rotary-axis-dependent rotation error amount as the axis-dependent translation error amount and the axis-dependent rotation error amount, respectively, based on the command rotary axis position, the translation compensation amount calculation means may calculate the translation compensation amount based on the rotary-axis-dependent translation error amount, and the rotation compensation amount calculation means may calculate the rotation compensation amount based on the rotary-axis-dependent rotation error amount.

The axis-dependent error amount calculation means may calculate a linear-axis-dependent translation error amount and a linear-axis-dependent rotation error amount as the axis-dependent translation error amount and the axis-dependent rotation error amount, respectively, based on the command linear axis position, the translation compensation amount calculation means may calculate the translation compensation amount based on the linear-axis-dependent translation error amount, and the rotation compensation amount calculation means may calculate the rotation compensation amount based on the linear-axis-dependent rotation error amount.

The axis-dependent error amount calculation means may calculate a linear-axis-dependent translation error amount and a linear-axis-dependent rotation error amount, based on the command linear axis position, and calculates a rotary-axis-dependent translation error amount and a rotary-axis-dependent rotation error amount, based on the command rotary axis position, as the axis-dependent translation error amount and the axis-dependent rotation error amount, respectively, the translation compensation amount calculation means may calculate the translation compensation amount based on the linear-axis-dependent translation error amount and the rotary-axis-dependent translation error amount, and the rotation compensation amount calculation means may calculate the rotation compensation amount based on the linear-axis-dependent rotation error amount and the rotary-axis-dependent rotation error amount.

The rotation compensation amount may be obtained as a rotary axis compensation amount for rotation compensation of an actual tool length compensation vector having a rotation error with respect to a tool length compensation vector.

The translation compensation amount may be obtained as a translation compensation amount with respect to a tool reference point vector representing a tool reference point on a table coordinate system.

The multi-axis machine may use at least three linear axes and three rotary axes for tool head rotation to machine the workpiece mounted on the table, and the rotary-axis-dependent translation and rotation error amounts may be translation and rotation error amounts for the three rotary axes for tool head rotation.

The multi-axis machine may use at least three linear axes, one rotary axis for tool head rotation, and two rotary axes for table rotation to machine the workpiece mounted on the table, and the rotary-axis-dependent translation and rotation error amounts may be translation and rotation error amounts for the one rotary axis for tool head rotation and translation and rotation error amounts for the two rotary axes for table rotation.

The multi-axis machine may use at least three linear axes, two rotary axes for tool head rotation, and one rotary axis for table rotation to machine the workpiece mounted on the table, and the rotary-axis-dependent translation and rotation error amounts may be translation and rotation error amounts for the two rotary axes for tool head rotation and translation and rotation error amounts for the one rotary axis for table rotation.

The multi-axis machine may use at least three linear axes and three rotary axes for table rotation to machine the workpiece mounted on the table, and the rotary-axis-dependent translation and rotation error amounts may be translation and rotation error amounts for the three rotary axes for table rotation.

The axis-dependent error amount calculation means may divide a space of three-dimensional coordinate system based on the three linear axes or the three rotary axes into lattice-like regions arranged at regular intervals along the axes, lattice point error vectors of a rotation error amount and a translation error amount at each lattice point of the lattice-like regions may be stored, and linear-axis-dependent rotation and translation error amounts or rotary-axis-dependent rotation and translation error amounts at the positions of the three linear or three rotary axes may be calculated based on the lattice point error vectors.

The axis-dependent error amount calculation means may divide a space of two-dimensional coordinate system based on two of the three linear axes or two of the three rotary axes into lattice-like regions arranged at regular intervals along the axes, lattice point error vectors of a rotation error amount and a translation error amount at each lattice point of the divided lattice-like regions may be stored, and linear-axis-dependent rotation and translation error amounts or rotary-axis-dependent rotation and translation error amounts at the positions of the two linear or two rotary axes may be calculated based on the lattice point error vectors.

The axis-dependent error amount calculation means may divide a space of one-dimensional coordinate system based on one of the three linear axes or one of the three rotary axes into lattice-like regions arranged at regular intervals along the axis, lattice point error vectors of a rotation error amount and a translation error amount at each lattice point of the divided lattice-like regions may be stored, and linear-axis-dependent rotation and translation error amounts or rotary-axis-dependent rotation and translation error amounts at the position of the one linear or one rotary axis may be calculated based on the lattice point error vectors.

The command linear axis position and the command rotary axis position may be the positions of the three linear axes and the three rotary axes, respectively, interpolated based on a program command.

According to the present invention, the error amounts are set in association with respective errors, the translation compensation amount is obtained from the error amounts and added to the command linear axis position, and the rotation compensation amount is also obtained as the rotary axis compensation amount and added to the command rotary axis position. Thereupon, the tool center point can be moved to the error-free position, and the tool posture can also be compensated in an error-free direction to ensure high-precision machining. This high-precision machining can be performed by means of multi-axis machines of a tool-head-rotation type, mixed two-axis table type, mixed two-axis tool head type, and table rotation type.

BRIEF DESCRIPTION OF THE DRAWINGS

FIG. 17 is a diagram illustrating how error data Dtr of a two-dimensional coordinate system and its derivative rotation error matrix Mtrr and translation error vector Mtrt are created;

FIG. 18 is a diagram illustrating how error data Dhr of a two-dimensional coordinate system and its derivative rotation error matrix Mhrr and translation error vector Mhrt are created;

FIG. 19 is a diagram illustrating how error data Dtr of a one-dimensional coordinate system and its derivative rotation error matrix Mtrr and translation error vector Mtrt are created;

FIG. 20 is a table illustrating a numerical calculation example in which compensation amounts are calculated based on rotation and translation error amounts and a tool length compensation amount in the multi-axis machine of the tool-head-rotation type;

FIG. 21 is a table illustrating a numerical calculation example in which compensation amounts are calculated based on rotation and translation error amounts and a tool length compensation amount in the multi-axis machine of the table-rotation type;

DETAILED DESCRIPTION OF THE PREFERRED EMBODIMENTS

The present invention is intended to provide a multi-axis machine comprising at least three linear axes and three rotary axes.

Figures 1, 2:
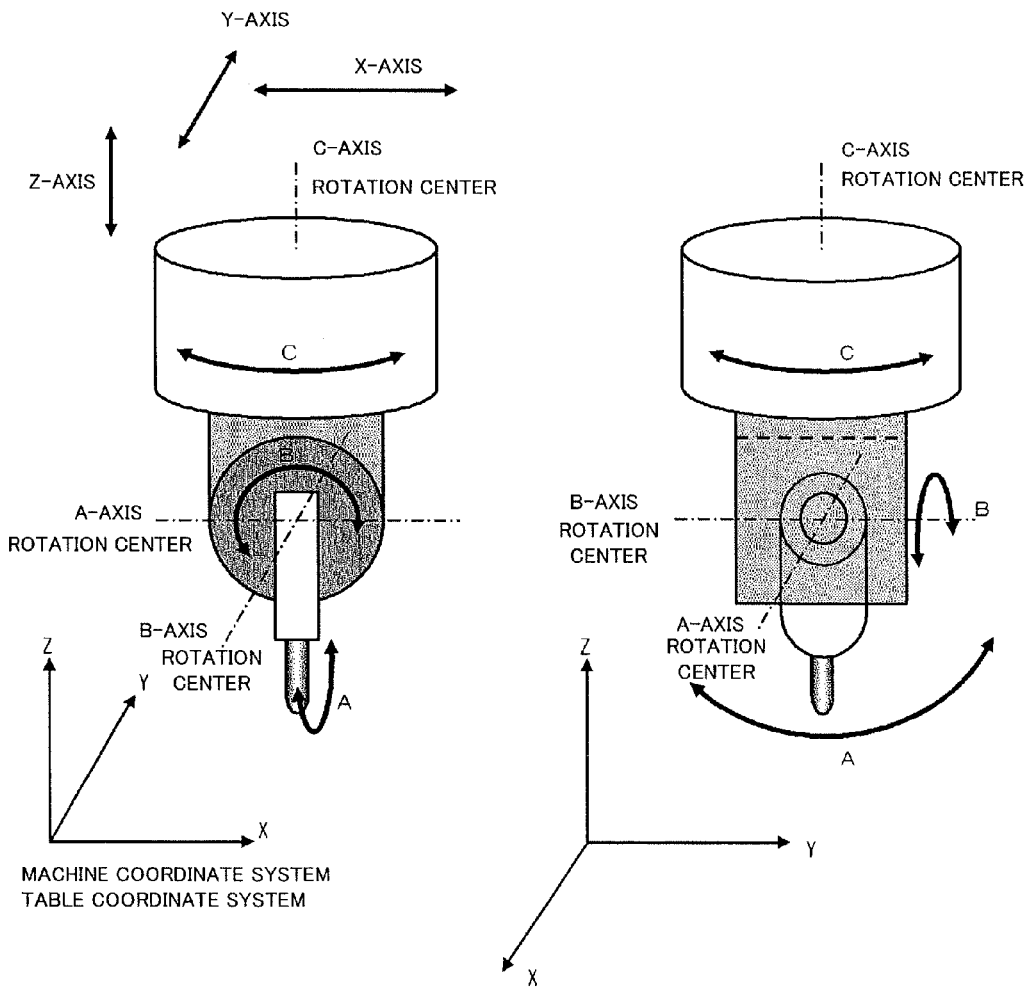
FIG. 1 is a table illustrating error categories.
FIG. 2 is a diagram illustrating a multi-axis machine of a tool-head-rotation type in which a tool head is rotated about three rotary axes.
Figure 3:
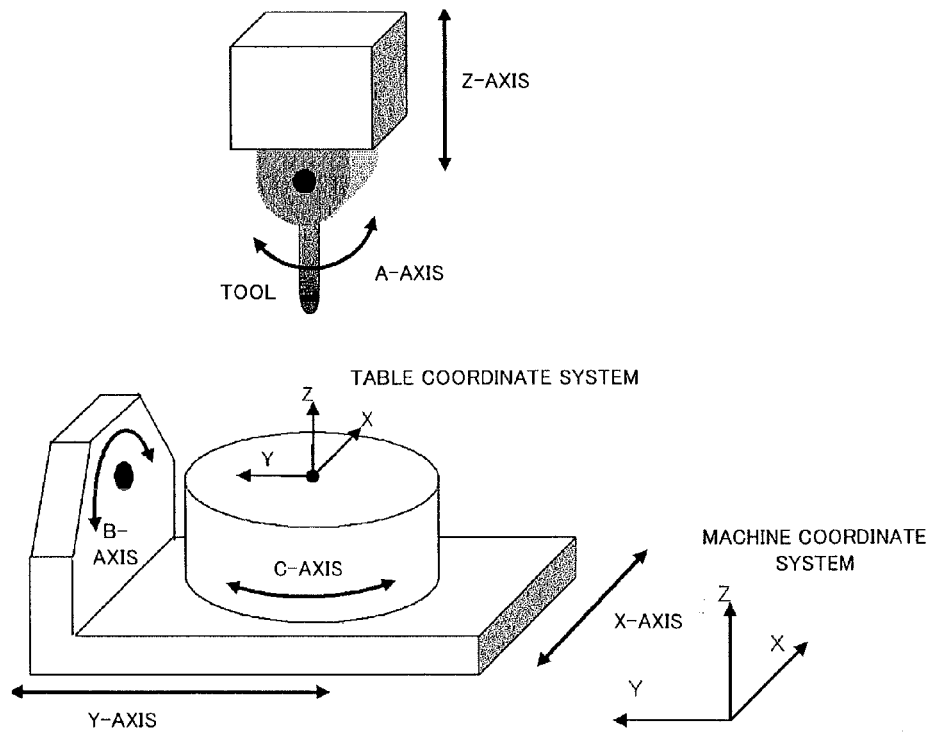
FIG. 3 is a diagram illustrating a multi-axis machine of a mixed two-axis table type in which a table is rotated about two rotary axes and a tool head is rotated about a single axis.
Figure 4:
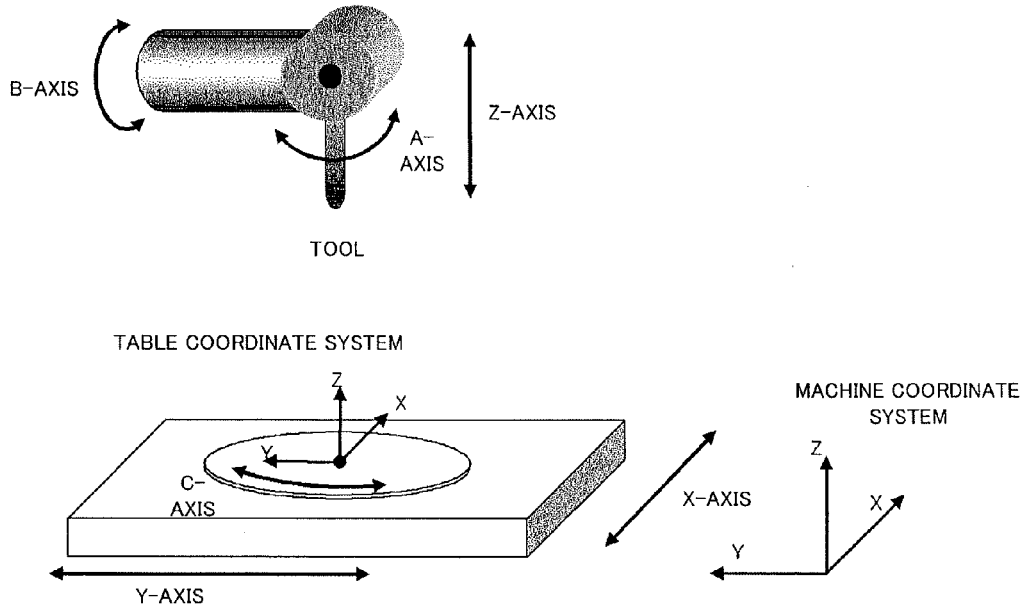
FIG. 4 is a diagram illustrating a multi-axis machine of a mixed two-axis tool head type in which a tool head is rotated about two rotary axes and a table is rotated about a single axis.
Figure 5:
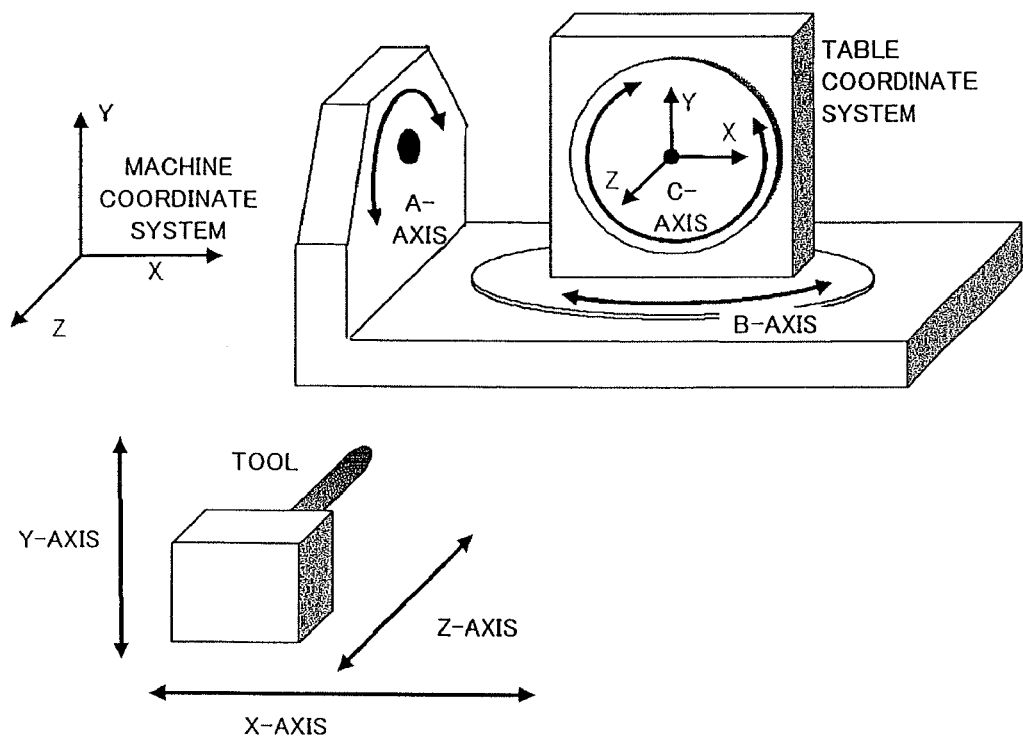
FIG. 5 is a diagram illustrating a multi-axis machine of a table-rotation type in which a table is rotated about three rotary axes.

FIGS. 2 to 5 show examples of the multi-axis machine controlled by a numerical controller according to the present invention. The example shown in FIG. 2 is a tool-head-rotation type in which a tool head is rotated about three rotary axes. The example shown in FIG. 3 is a mixed two-axis table type (in which a table is rotated about two rotary axes and a tool head is rotated about a single axis). The example shown in FIG. 4 is a mixed two-axis tool head type (in which a tool head is rotated about two rotary axes and a table is rotated about a single rotary axis). The example shown in FIG. 5 is a table-rotation type in which a table is rotated about three axes.

<Schematic Diagram>

Figures 6, 7:
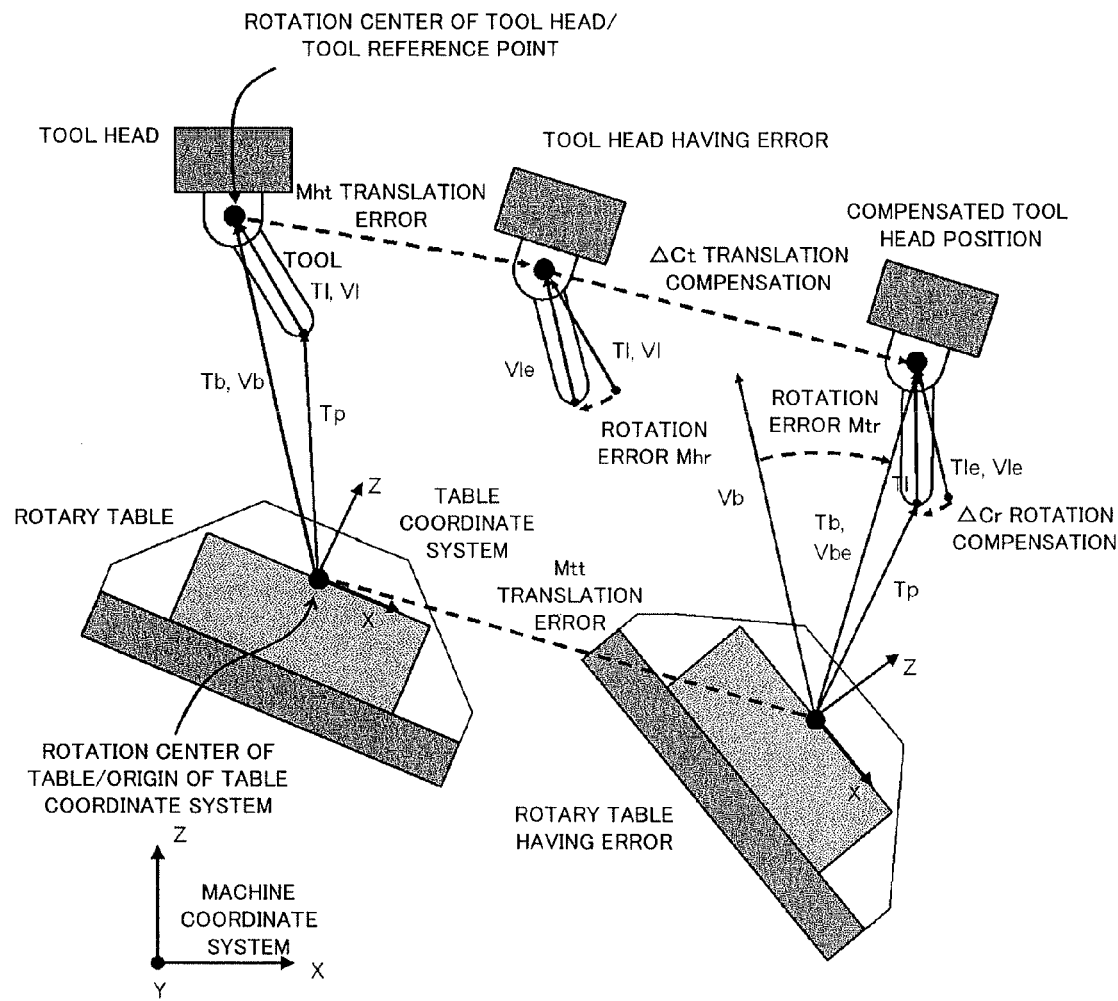
FIG. 6 is a diagram illustrating an image of compensation of translation and rotation compensation amounts ΔCt and ΔCr by a rotary tool head.
FIG. 7 shows an example of a command program for controlling a machine with three rotary axes.

The basic function of the numerical controller according to the present invention will be described first. FIG. 6 is a diagram showing a multi-axis machine in which a tool head and a table have their respective rotary axes. The tool head and the table each have a single rotary axis. While the respective centers of these two rotary axes are shown to be parallel to each other in this diagram image, they are thus shown for ease of illustration. In general, a tool head and a table are arranged so that their respective rotary axis centers are not parallel and each have zero to three rotary axes, as shown in FIGS. 2 to 5. For ease of illustration, however, one rotary axis of the tool head and one rotary axis of the table, whose rotary axis centers are perpendicular to the drawing plane, are imaged uniformly and conceptually. Error and compensation amounts, which are very small, are exaggeratedly depicted for better understanding. This also applies to FIG. 9, which will be described later.

<Machine Configuration and Command Program>

A tool center point position is commanded as an (X, Y, Z) position on a table coordinate system that is fixed on the table and rotates as the table rotates. The commanded position is represented as a tool center point position Tp on the table coordinate system. When the table rotates, its center of rotation is assumed to be coincident with the origin of the table coordinate system. A-, B-, and C-axes are rotary axes around X-, Y-, and Z-axes, respectively, and serve to rotate the tool head and/or the table. It is assumed that the tool direction is commanded by the rotary axis positions A, B and C, a tool length compensation number is commanded by H, and a tool length compensation amount is h. The tool direction is assumed to be Z-axis direction if A=B=C=zero deg. is given.

The numerical controller controls the position of a tool reference point vector Tb, as a position to which the machine is to be moved, based on the X-, Y-, and Z-axes on a machine coordinate system, and controls the tool direction based on the A-, B-, and C-axes corresponding to the rotary axis positions of the tool head and the table. The tool reference point Tb represents a specific position of the tool head. When the tool head rotates, its center of rotation is assumed to be coincident with the tool reference point Tb. In FIG. 6, paired vectors, enumerated like "Tl, Vl", individually indicate cases where one and the same vector is represented on the table coordinate system and the machine coordinate system. The machine coordinate system is a coordinate system fixed on the machine.

FIG. 7 shows an example of a command program. G43.4 is a command for a mode (tool center point control mode) in which the position Tp and the tool direction are commanded by X_Y_Z_ and A_B_C_, respectively. G49 is a command for canceling the mode command.

<Tool Length Compensation vector and Tool Reference Point Vector>

If the positions of the rotary A-, B-, and C-axes are A, B and C, respectively, a tool length compensation vector Tl ((i, j, k)$^T$*h) on the table coordinate system can be expressed by the following equations (1). Here (i, j, k)$^T$ is a unit vector that represents the tool direction on the table coordinate system, and $^T$ represents transposition. In the description to follow, however, $^T$ will not be particularly inscribed if obvious. Ra, Rb and Rc are transformation matrices that represent rotation transforms based on the movement of the A-, B-, and C-axes to their respective positions A, B and C. A reference tool length compensation vector (0, 0, h) as a tool length compensation vector with A=B=C=0 deg. is multiplied by Ra, Rb and Rc in the order of the arrangement of the rotary axes from the tool to the table in the machine configuration. As shown in FIGS. 2 to 5, in this case, the A-, B-, and C-axes are arranged in the order named in the direction from the tool to the table.

$$Tl = \begin{bmatrix} i \\ j \\ k \end{bmatrix} h = Rc * Rb * Ra * \begin{bmatrix} 0 \\ 0 \\ h \end{bmatrix} \quad (1)$$

$$Ra = \begin{bmatrix} 1 & 0 & 0 \\ 0 & \cos A & -\sin A \\ 0 & \sin A & \cos A \end{bmatrix}$$

$$Rb = \begin{bmatrix} \cos B & 0 & \sin B \\ 0 & 1 & 0 \\ -\sin B & 0 & \cos B \end{bmatrix}$$

$$Rc = \begin{bmatrix} \cos C & -\sin C & 0 \\ \sin C & \cos C & 0 \\ 0 & 0 & 1 \end{bmatrix}$$

The tool reference point Tb on the table coordinate system is given by $$Tb = Tp + Tl. \quad (2)$$

A transformation matrix from the machine coordinate system to the table coordinate system based on the table rotation is assumed to be Rt, which depends on the machine configuration. If the axes of table rotation are A-, B-, and C-axes arranged in the order named in the direction from the tool to the table, as shown in FIG. 5, Rt=Rc*Rb*Ra is obtained. If the table has no rotary axis, as shown in FIG. 2, Rt is a unit matrix. Rt=Rc*Rb and Rt=Rc are given in FIGS. 3 and 4, respectively.

Vb that represents the tool reference point vector Tb on the machine coordinate system is given by $$Vb = Rt^{-1} * Tb \quad (3)$$

where Rt$^{-1}$ is the inverted matrix of Rt.

A tool length compensation vector Vl on the machine coordinate system is given by $$Vl = Rt^{-1} * Tl \quad (4)$$

<Rotation Error and Translation Error>

It is generally known that a moving body is subject to errors along and around the X-, Y-, and Z-axes, depending on linear- and rotary-axis positions for moving the moving body. For example, errors that depend on the linear-axis position are described in "JIS B6191 5.231", and errors that depend on the rotary-axis position are described in "JIS B6190-7 3.1.5 FIG. 1b)".

Figures 8, 9:
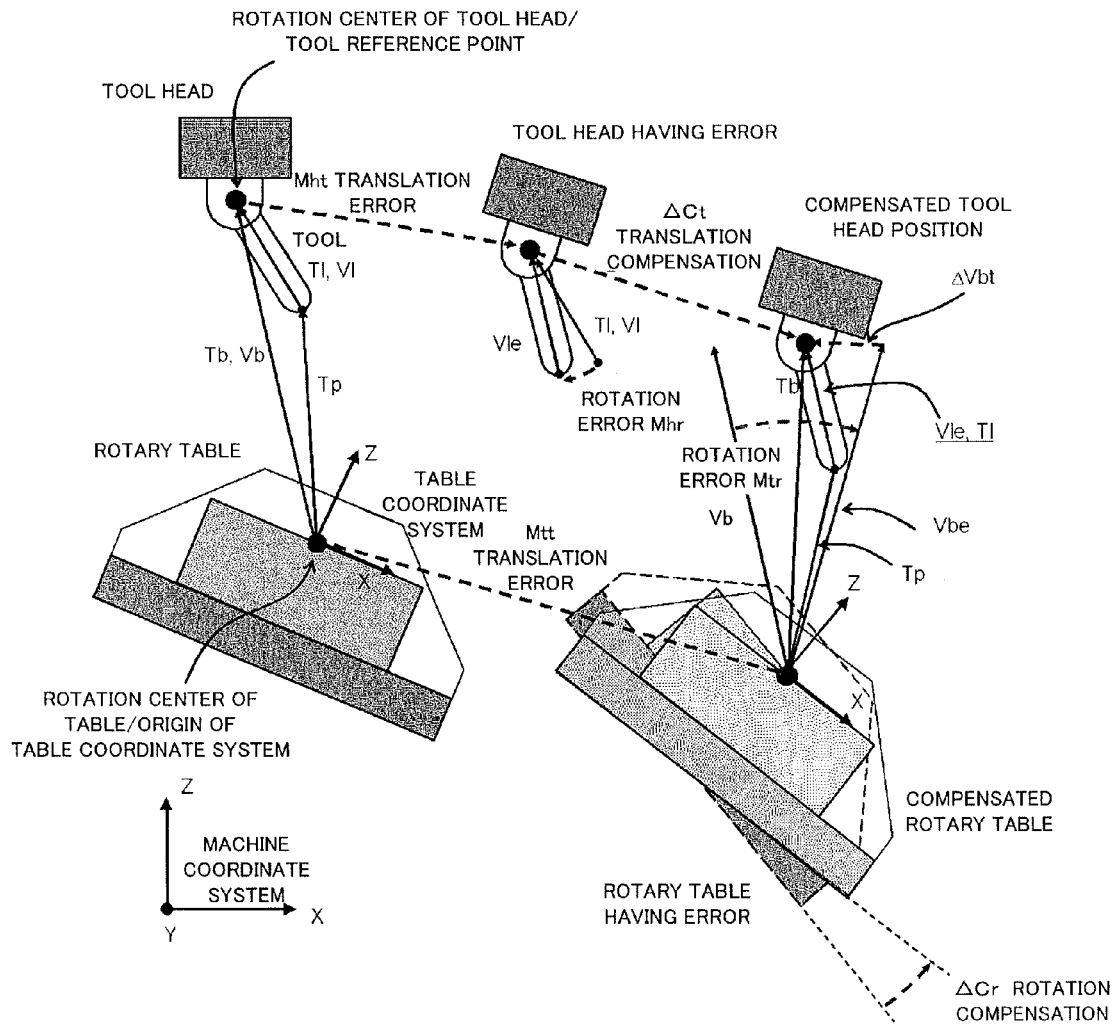
FIG. 8 is a table containing matrices, vectors, and error data symbols for calculation of error amounts based on the error categories of FIG. 1.
FIG. 9 is a diagram illustrating an image of compensation of the rotation compensation amount ΔCr with the rotary table and compensation of the translation compensation amount ΔCt with the rotary tool head position relative to the rotary table.

Based on FIG. 1, FIG. 8 shows matrices and vectors for the calculation of error amounts together with symbols. In FIG. 8, columns integrated individually for the tool head and the table are used in place of columns of FIG. 1 for rotation and translation error amounts, and columns for error data (described later) are added to the right-hand end. Symbols in parentheses are suffixes.

<Rotation Error Matrix>

Rotation error matrices that represent rotation errors are given by the following equations (5) and (6). In each element character, 'ε' represents an error amount, and 'I', 'J' and 'K' designate error amounts around the X-, Y-, and Z-axes, respectively. For example, elements of 'Mhlr' are error amounts around the X-, Y-, and Z-axes that depend on the position of the linear axis on which the tool head as the moving body lies, that is, linear-axis-dependent rotation error amounts. Elements of 'Mhrr' are error amounts around the X-, Y-, and Z-axes that depend on the position of the rotary axis on which the tool head lies, that is, rotary-axis-dependent rotation error amounts. Likewise, elements of 'Mtlr' are error amounts around the X-, Y-, and Z-axes that depend on the position of the linear axis on which the table as the moving body lies, while those of 'Mtrr' are error amounts around the X-, Y-, and Z-axes that depend on the position of the rotary axis on which the table lies. These are axis-dependent rotation error amounts. The X-, Y-, and Z-axes are axes on the machine coordinate system. Thus, the error amounts with respect to the table as the moving body are ones of the table itself on the machine coordinate system.

Originally, these matrices are each represented by trigonometric functions, but they are approximated to sin(ε*)=ε* and cos(ε*)=1, based on the assumption that each error amount is sufficiently small. Here ε* is each error amount. 'Mhr' and 'Mtr' are matrices based on a combination of two rotation errors obtained by performing calculation of Mhr=Mhlr*Mhrr and Mtr=Mtlr*Mtrr. Specifically, 'Mhr' is a rotation error matrix dependent on the axial position of the tool head, and 'Mtr' is a rotation error matrix dependent on the axial position of the table. Terms involving squares and higher powers of the error amounts are neglected. Naturally, the matrices may be free from such approximation. In FIG. 6, matrices with only these combined errors are shown, and illustration of the matrices is omitted.

$$Mhlr = \begin{bmatrix} 1 & -\varepsilon Khl & \varepsilon Jhl \\ \varepsilon Khl & 1 & -\varepsilon Ihl \\ -\varepsilon Jhl & \varepsilon Ihl & 1 \end{bmatrix} \quad (5)$$

$$Mhrr = \begin{bmatrix} 1 & -\varepsilon Khr & \varepsilon Jhr \\ \varepsilon Khr & 1 & -\varepsilon Ihr \\ -\varepsilon Jhr & \varepsilon Ihr & 1 \end{bmatrix}$$

$$Mhr = Mhlr * Mhrr$$

$$= \begin{bmatrix} 1 & -\varepsilon Khl - \varepsilon Khr & \varepsilon Jhl + \varepsilon Jhr \\ \varepsilon Khl + \varepsilon Khr & 1 & -\varepsilon Ihl - \varepsilon Ihr \\ -\varepsilon Jhl - \varepsilon Jhr & \varepsilon Ihl + \varepsilon Ihr & 1 \end{bmatrix}$$

$$Mtlr = \begin{bmatrix} 1 & -\varepsilon Ktl & \varepsilon Jtl \\ \varepsilon Ktl & 1 & -\varepsilon Itl \\ -\varepsilon Jtl & \varepsilon Itl & 1 \end{bmatrix} \quad (6)$$

$$Mtrr = \begin{bmatrix} 1 & -\varepsilon Ktr & \varepsilon Jtr \\ \varepsilon Ktr & 1 & -\varepsilon Itr \\ -\varepsilon Jtr & \varepsilon Itr & 1 \end{bmatrix}$$

$$Mtr = Mtlr * Mtrr$$

$$= \begin{bmatrix} 1 & -\varepsilon Ktl - \varepsilon Ktr & \varepsilon Jtl + \varepsilon Jtr \\ \varepsilon Ktl + \varepsilon Ktr & 1 & -\varepsilon Itl - \varepsilon Itr \\ -\varepsilon Jtl - \varepsilon Jtr & \varepsilon Itl + \varepsilon Itr & 1 \end{bmatrix}$$

If there is no moving axis (on which the moving body lies) or if the elements of the error amounts are small enough to be neglected, moreover, the matrices are unit matrices. Thus, if linear-axis-dependent rotation errors are negligible although rotary-axis-dependent rotation errors are significant, then matrices of the linear-axis-dependent rotation errors are unit matrices, with the result that these matrices are not calculated in the calculation of rotation and translation compensation amounts, which will be described later (although the calculation itself of the matrices is performed, it does not produce substantial results). If rotary-axis-dependent rotation errors are negligible although linear-axis-dependent rotation errors are significant, by contrast, then matrices of the rotary-axis-dependent rotation errors are unit matrices, with the result that these matrices are not calculated in the calculation of the rotation and translation compensation amounts, which will be described later.

<Translation Error Vector>

Translation error vectors that represent translation errors are given by the following equations (7) and (8). In each element character, '$\varepsilon$' represents an error amount, and 'X', 'Y' and 'Z' designate error amounts along the X-, Y-, and Z-axes, respectively. For example, elements of 'Mhlt' are error amounts along the X-, Y-, and Z-axes that depend on the position of the linear axis on which the tool head as the moving body lies, that is, linear-axis-dependent translation error amounts. Elements of 'Mhrt' are error amounts along the X-, Y-, and Z-axes that depend on the position of the rotary axis on which the tool head lies, that is, rotary-axis-dependent translation error amounts. Likewise, elements of 'Mtlt' are error amounts along the X-, Y-, and Z-axes that depend on the position of the linear axis on which the table lies, while those of 'Mtrt' are error amounts along the X-, Y-, and Z-axes that depend on the position of the rotary axis on which the table lies. These are axis-dependent translation error amounts. The X-, Y-, and Z-axes are axes on the machine coordinate system. Thus, the error amounts with respect to the table are ones of the table itself on the machine coordinate system.

'Mht' and 'Mtt' are vectors based on a combination of two translation errors obtained by performing calculation of Mht=Mhlt+Mhrt and Mtt=Mtlt+Mtrt. Specifically, 'Mht' is a translation error matrix dependent on the axial position of the tool head, and 'Mtt' is a translation error matrix dependent on the axial position of the table. In FIG. 6, matrices with only these combined errors are shown, and illustration of the vectors is omitted.

$$Mhlt = \begin{bmatrix} \varepsilon Xhl \\ \varepsilon Yhl \\ \varepsilon Zhl \end{bmatrix} \quad (7)$$

$$Mhrt = \begin{bmatrix} \varepsilon Xhr \\ \varepsilon Yhr \\ \varepsilon Zhr \end{bmatrix}$$

$$Mht = Mhlt + Mhrt = \begin{bmatrix} \varepsilon Xhl + \varepsilon Xhr \\ \varepsilon Yhl + \varepsilon Yhr \\ \varepsilon Zhl + \varepsilon Zhr \end{bmatrix}$$

$$Mtlt = \begin{bmatrix} \varepsilon Xtl \\ \varepsilon Ytl \\ \varepsilon Ztl \end{bmatrix} \quad (8)$$

$$Mtrt = \begin{bmatrix} \varepsilon Xtr \\ \varepsilon Ytr \\ \varepsilon Ztr \end{bmatrix}$$

$$Mtt = Mtlt + Mtrt = \begin{bmatrix} \varepsilon Xtl + \varepsilon Xtr \\ \varepsilon Ytl + \varepsilon Ytr \\ \varepsilon Ztl + \varepsilon Ztr \end{bmatrix}$$

If there is no moving axis (on which the moving body lies) or if the elements of the error amounts are small enough to be neglected, as described above in connection with the rotation error amounts, furthermore, the vectors are zero vectors. Thus, if linear-axis-dependent translation errors are negligible although rotary-axis-dependent translation errors are significant, then vectors of the linear-axis-dependent translation errors are zero vectors, with the result that these vectors are not calculated in the calculation of translation compensation amounts, which will be described later. If the rotary-axis-dependent translation errors are negligible although the linear-axis-dependent translation errors are significant, by contrast, then vectors of the rotary-axis-dependent translation errors are zero vectors, with the result that these vectors are not calculated in the calculation of the translation compensation amounts, which will be described later.

<Rotation Errors of Tool Reference Point Vector and Tool Length Compensation vector>

Since the rotation error amounts are error amounts around the X-, Y-, and Z-axes on the machine coordinate system, as mentioned before, error computation is performed for the tool reference point vector and the tool length compensation vector on the machine coordinate system (see FIG. 6).

An actual tool reference point vector Vbe with a rotation error relative to the tool reference point vector Tb on the machine coordinate system is given by the following equation (9) based on the rotation error matrix Mtr for the table. Thus, the actual tool reference point vector Vbe becomes the vector Tb on the table coordinate system on the table that is rotated by the amount corresponding to the table rotation error.

$$Vbe = Mtr * Vb \quad (9)$$

An actual tool length compensation vector Vle with a rotation error relative to 'Vl' is given by the following equation (10) based on the rotation error matrix Mhr for the tool head.

$$Vle = Mhr * Vl. \quad (10)$$

<Rotation Compensation>

Rotation compensation amounts ΔCr (ΔA, ΔB, ΔC) for compensating an erroneous tool direction to the commanded direction are calculated (see FIG. 6).

An actual tool length compensation vector Tle on the table coordinate system associated with the actual tool length compensation vector Vle is firstly calculated by a table rotation error inverted transform (product of Mtr$^{-1}$ in the following equation (11)) for Vle as viewed on the table coordinate system on the table with errors and secondly it becomes a vector on the table coordinate system compensated with the rotation compensation amounts ΔCr (ΔA, ΔB, ΔC) by transforming of Rct. Thus, Tle is given by $$Tle = Rct * Mtr^{-1} * Vle. \quad (11)$$

The following is a description of 'Rct'. While 'Rt' is a transformation matrix from the machine coordinate system to the table coordinate system based on table rotation, 'Rct' is a transformation matrix from the machine coordinate system to the table coordinate system based on table rotation in consideration of the rotation compensation amounts ΔCr (ΔA, ΔB, ΔC), that is, a transformation matrix from the machine coordinate system to the table coordinate system compensated by the rotation compensation amounts ΔCr (ΔA, ΔB, ΔC). Thus, 'Rct' is created based on 'Rca', 'Rcb' and 'Rcc' of the following equations (12). If the axes of table rotation are A-, B-, and C-axes arranged in the order named in the direction from the tool to the table, as shown in FIG. 5, 'Rct' is Rct=Rcc*Rcb*Rca. If the table rotation does not have any rotary axis, as shown in FIG. 2, 'Rct' is a unit matrix, so that Rct=Rcc*Rcb and Rct=Rcc are given for the cases of FIGS. 3 and 4, respectively. In 'Rca', 'Rcb' and 'Rcc' of equations (12), the first right-side formula is a matrix based on an original trigonometric function, and the second right-side formula is a matrix approximated with sin(Δα)=Δα and cos(Δα)=1 (where α=A, B, C) based on the assumption that the compensation amount elements (ΔA, ΔB, ΔC) are sufficiently small.

$$Rca = \begin{bmatrix} 1 & 0 & 0 \\ 0 & \cos(A+\Delta A) & -\sin(A+\Delta A) \\ 0 & \sin(A+\Delta A) & \cos(A+\Delta A) \end{bmatrix} \quad (12)$$

$$= \begin{bmatrix} 1 & 0 & 0 \\ 0 & \cos A - \sin A * \Delta A & -\sin A - \cos A * \Delta A \\ 0 & \sin A + \cos A * \Delta A & \cos A - \sin A * \Delta A \end{bmatrix}$$

$$Rcb = \begin{bmatrix} \cos(B+\Delta B) & 0 & \sin(B+\Delta B) \\ 0 & 1 & 0 \\ -\sin(B+\Delta B) & 0 & \cos(B+\Delta B) \end{bmatrix}$$

$$= \begin{bmatrix} \cos B - \sin B * \Delta B & 0 & \sin B + \cos B * \Delta B \\ 0 & 1 & 0 \\ -\sin B - \cos B * \Delta B & 0 & \cos B - \sin B * \Delta B \end{bmatrix}$$

$$Rcc = \begin{bmatrix} \cos(C+\Delta C) & -\sin(C+\Delta C) & 0 \\ \sin(C+\Delta C) & \cos(C+\Delta C) & 0 \\ 0 & 0 & 1 \end{bmatrix}$$

$$= \begin{bmatrix} \cos C - \sin C * \Delta C & -\sin C - \cos C * \Delta C & 0 \\ \sin C + \cos C * \Delta C & \cos C - \sin C * \Delta C & 0 \\ 0 & 0 & 1 \end{bmatrix}$$

As indicated by the following equations (13), moreover, the originally commanded tool length compensation vector Tl needs to be obtained by multiplying the erroneous actual tool length compensation vector Tle by a transformation matrix Rd based on the rotation compensation amounts ΔCr (ΔA, ΔB, ΔC).

$$Rd * Tle = Tl \quad (13)$$

$$Rd = \begin{bmatrix} 1 & \sin B * \Delta A - \Delta C & \sin C * \cos B * \Delta A + \cos C * \Delta B \\ \Delta C - \sin B * \Delta A & 1 & -\cos C * \cos B * \Delta A + \sin C * \Delta B \\ -\cos C * \Delta B - \sin C * \cos B * \Delta A & -\sin C * \Delta B + \cos C * \cos B * \Delta A & 1 \end{bmatrix}$$

Here, as indicated by the following equations (14), 'Rd' is a product of 'Rda', 'Rdb' and 'Rdc' in the order of the arrangement of the rotary axes from the tool to the table. 'Rda', 'Rdb' and 'Rdc' are transformation matrices that represent changes of vectors on the table coordinate system in case where the A-, B-, and C-axes at positions (A, B, C) moves by an amount ΔA, ΔB and ΔC corresponding to error compensations. Specifically, if the A-, B-, and C-axes are located in the order named in the direction from the tool to the table in the machine configuration, 'Rda' is a transformation matrix that rotates by ΔA about an A-axis rotation center on the table coordinate system when the B- and C-axis positions are B and C, respectively. 'Rdb' is a transformation matrix that rotates by ΔB about a B-axis rotation center on the table coordinate system when the C-axis position is C. 'Rdc' is a transformation matrix that rotates by ΔC about a C-axis rotation center on the table coordinate system, that is, the Z-axis.

The compensation movements ΔA, ΔB and ΔC are assumed to be sufficiently small and are approximated to sin (Δα)=Δα and cos (Δα)=1 (where α=A, B, C). Further, terms involving squares and higher powers of the compensation movements are neglected. Naturally, the matrices may be free from such approximation.

$$Rd = Rdc * Rdb * Rda \quad (14)$$

$$Rdc = \begin{bmatrix} 1 & -\Delta C & 0 \\ \Delta C & 1 & 0 \\ 0 & 0 & 1 \end{bmatrix}$$

-continued $$Rdb = \begin{bmatrix} 1 & 0 & \cos C * \Delta B \\ 0 & 1 & \sin C * \Delta B \\ -\cos C * \Delta B & -\sin C * \Delta B & 1 \end{bmatrix}$$

$$Rda = \begin{bmatrix} 1 & \sin B * \Delta A & \sin C * \cos B * \Delta A \\ -\sin B * \Delta A & 1 & -\cos C * \cos B * \Delta A \\ -\sin C * \cos B * \Delta A & \cos C * \cos B * \Delta A & 1 \end{bmatrix}$$

These equations lead to the following equation (15). $\Delta A$, $\Delta B$ and $\Delta C$ are obtained by solving the following simultaneous equation (15) for $\Delta A$, $\Delta B$ and $\Delta C$ with the aforementioned equations (4) and (10).

$$Rd*Rct*Mtr^{-1}*Vle=Tl. \tag{15}$$

When the tool length compensation vector Tl and the actual tool length compensation vector Vle are given, however, $\Delta A$, $\Delta B$ and $\Delta C$ cannot be analytically uniquely obtained from the above equation (15). In this case, therefore, solutions of $\Delta A$, $\Delta B$ and $\Delta C$ are obtained under respective conditions $\Delta A=0$, $\Delta B=0$, and $\Delta C=0$, and the solution with which $(\Delta A^2+\Delta B^2+\Delta C^2)$ is minimal is selected. In other words, $\Delta B$ and $\Delta C$ obtained by solving equation (15) with $\Delta A=0$ are regarded as a first solution ($\Delta A1$ (=0), $\Delta B1$, $\Delta C1$); $\Delta A$ and $\Delta C$ obtained by solving equation (15) with $\Delta B=0$ are regarded as a second solution ($\Delta A2$, $\Delta B2$ (=0), $\Delta C2$); and $\Delta A$ and $\Delta B$ obtained by solving equation (15) with $\Delta C=0$ are regarded as a third solution ($\Delta A3$, $\Delta B3$, $\Delta C3$(=0)). Then ($\Delta An$, $\Delta Bn$, $\Delta Cn$) which leads Dn expressed by the following equation (16) to minimum are $\Delta A$, $\Delta B$ and $\Delta C$ that are to be obtained, as a result, the rotation compensation amounts $\Delta Cr$ ($\Delta A$, $\Delta B$, $\Delta C$) are obtained.

$$Dn=\Delta An^2+\Delta Bn^2+\Delta Cn^2 (n=1, 2, 3). \tag{16}$$

There is an alternative method in which the compensation amount of an axis that is located nearest to a singular point is set to zero to obtain the compensation amounts of the other two axes. Alternatively, $\Delta A$, $\Delta B$ and $\Delta C$ may be obtained by combining ($\Delta An$, $\Delta Bn$, $\Delta Cn$) as follows:

$$(\Delta A, \Delta B, \Delta C) = (\sqrt{\Delta A2^2+\Delta A3^2}, \sqrt{\Delta B1^2+\Delta B3^2}, \sqrt{\Delta C1^2+\Delta C2^2}) \tag{17}$$

Strictly speaking, ($\Delta A$, $\Delta B$, $\Delta C$) of the above equation (17) is not a solution of the foregoing equation (15). Therefore, ($\Delta A$, $\Delta B$, $\Delta C$) of equation (17) is further regarded as ($\Delta A0$, $\Delta B0$, $\Delta C0$), and $\Delta A=\Delta A0$, $\Delta B=\Delta B0$, $\Delta C=\Delta C0$ are given as conditions, and under these conditions, first to third solutions of $\Delta A$, $\Delta B$ and $\Delta C$ may be obtained and $\Delta A$, $\Delta B$ and $\Delta C$ are set to obtain a solution that leads to the minimal Dn of the above equation (16).

<Translation Compensation>

Translation compensation amounts $\Delta Ct$ ($\Delta X$, $\Delta Y$, $\Delta Z$) are obtained as follows:

$$\Delta Ct=Vbe-Vb+Mtt-Mht+\Delta Vbt. \tag{18}$$

As seen from FIG. 6, the first to fourth right-side terms of the above equation (18) are elements for translation compensation. As indicated by the following equation (19), $\Delta Vbt$ of the fifth term is a movement on the machine coordinate system obtained by multiplying a translation compensation movement (Tb−Rdt*Tb) generated by the rotation compensation of the table rotary axes, from among the aforementioned rotary compensations, for the tool reference point vector Tb on the table coordinate system by $Rct^{-1}$. Thus, a correct tool reference point position Tb is obtained on the table coordinate system of the rotary table with its tool reference point compensated.

$$\Delta Vbt=Rct^{-1}*(Tb-Rdt*Tb). \tag{19}$$

Here 'Rdt' is a matrix representative of a rotation compensation of the table rotary axis, from among the aforementioned rotation compensations (Rdc, Rdb and Rda of equations (14)). In the case of the tool-head-rotation type of FIG. 2, therefore, there is no table rotary axis, so that 'Rdt' is a unit matrix, and $\Delta Vbt$ is a zero vector. Rdt=Rdc*Rdb, Rdt=Rdc, and Rdt=Rdc*Rdb*Rda are given in the cases of FIGS. 3, 4 and 5, respectively.

FIG. 6 shows an image of compensation of the rotation compensation amounts $\Delta Cr$ with the rotary tool head, that is, an image of the tool-head-rotation type for the rotation compensation amounts $\Delta Cr$. Therefore, $\Delta Vbt$ does not appear in FIG. 6. An image of compensation of the rotation compensation amounts $\Delta Cr$ with the rotary table is shown in FIG. 9, in which $\Delta Vbt$ appears. $\Delta Vbt$ of FIG. 9 indicates that it is created so that correct Tb is obtained on the table coordinate system of the rotary table compensated by the rotation compensation of $\Delta Cr$ (although the tool reference point becomes Vbe by the rotary table having errors).

In FIG. 9, "Vle, Tl" indicates that the "rotary table having errors" is changed into the "compensated rotary table" by the rotation compensation amounts $\Delta Cr$ ($\Delta A$, $\Delta B$, $\Delta C$) and that 'Vle' is equal to 'Tl' on the table coordinate system of the compensated rotary table, that is, that 'Vle' is transformed into 'Tl' on the table coordinate system of the compensated rotary table. This corresponds to the above equation (15).

The obtained rotation compensation amounts $\Delta Cr$ ($\Delta A$, $\Delta B$, $\Delta C$) are added to a command rotary axis position Pr(A, B, C) based on the A-, B-, and C-axes, and the translation compensation amount $\Delta Ct$ ($\Delta X$, $\Delta Y$, $\Delta Z$) is added to a command linear axis position Pl (X, Y, Z) based on the X-, Y-, and Z-axes. In this way, the tool length compensation vector matches the commanded tool length compensation vector Tl on the table coordinate system (of the compensated table), and the tool reference point matches the tool reference point vector Tb calculated according to equation (2). Therefore, the tool center point matches the commanded tool center point Tp. Consequently, the tool center point moves to an error-free position on the table coordinate system (of the compensated table), and the tool posture is also compensated in an error-free direction.

<Error Amount Setting and Calculation>

The following is a description of a method of obtaining the rotation error matrices (Mhlr, Mhrr, Mtlr, Mtrr) and translation error vectors (Mhlt, Mhrt, Mtlt, Mtrt) based on the command linear axis position Pl (X, Y, Z) and the command rotary axis position Pr (A, B, C).

The command linear axis position Pl is obtained according to the following equation (20) by prior art interpolation means. Here Pt (Ptx, Pty, Ptz) represents the position of the origin of the table coordinate system in the machine coordinate system. The command rotary axis position Pr (A, B, C) is also obtained by the prior art interpolation means.

$$Pl=Vb+Pt. \tag{20}$$

First, in the case of the tool-head-rotation type shown in FIG. 2, the rotation error matrix (Mhlr) and translation error vector (Mhlt) of the tool head that depend on the command linear axis position Pl (X, Y, Z) for moving the tool head are calculated. The following is a description of a method of this calculation.

Figure 10:
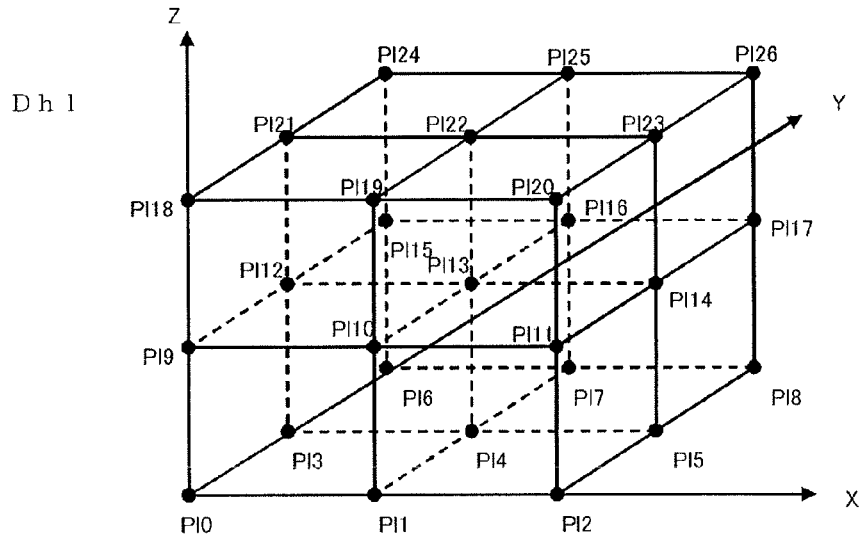
FIG. 10 is a diagram showing an XYZ three-dimensional coordinate space divided into lattice-like regions and error data Dhl of the three-dimensional coordinate system.

FIG. 10 is a diagram showing an XYZ three-dimensional coordinate space that is divided into lattice-like regions. The space of the three-dimensional coordinate system based on the X-, Y-, and Z-axes is in the form of a regular lattice. Lattice points Pl0 to Pl26 are points at which dividing lines between the lattice-like regions cross one another. FIG. 10 shows only a part of the coordinate system. Actually, the entire area that is mechanically movable is divided into the lattice-like regions.

Mechanically induced error amounts (translation and rotation error amounts) at the lattice points are measured in advance. There is no description of a method of this measurement. The error amounts are represented by six-dimensional lattice point error vectors Un (UnX, UnY, UnZ, UnI, UnJ, UnK: n=0 to 26). UnX, UnY and UnZ correspond individually to translation error amounts that depend on Pl, that is, to elements ϵXhl, ϵYhl and ϵZhl of 'Mhlt'. UnI, UnJ and UnK correspond individually to rotation error amounts that depend on P1, that is, elements ϵIhl, ϵJhl and ϵKhl of 'Mhlr'. A data group comprising the lattice point error vectors is assumed to be error data Dhl (see FIG. 8 and equations (5) and (7)). The lattice point error vectors are stored in a nonvolatile memory or the like. The lattice point error vectors are absolute values.

If the coordinate space is divided into too small lattice-like regions, the amount of data on the lattice point error vectors increases, so that the necessary storage capacity of the memory inevitably becomes large. Therefore, arrangement of tens of lattice points for each axis can enable as compensation error calculation as possible and reduction of the data amount. Although the lattice-like divided regions have been described above as being arranged at regular intervals, the intervals do not always need to be regular. The intervals can be made variable by separately setting a lattice position in advance or calculating the lattice position according to a function.

The following is a description of a method of calculating the error amounts (the elements ϵXhl, ϵYhl and ϵZhl of 'Mhlt' and the elements ϵIhl, ϵJhl and ϵKhl of 'Mhlr') according to an arbitrary command linear axis position Pl (X, Y, Z).

Figure 11:
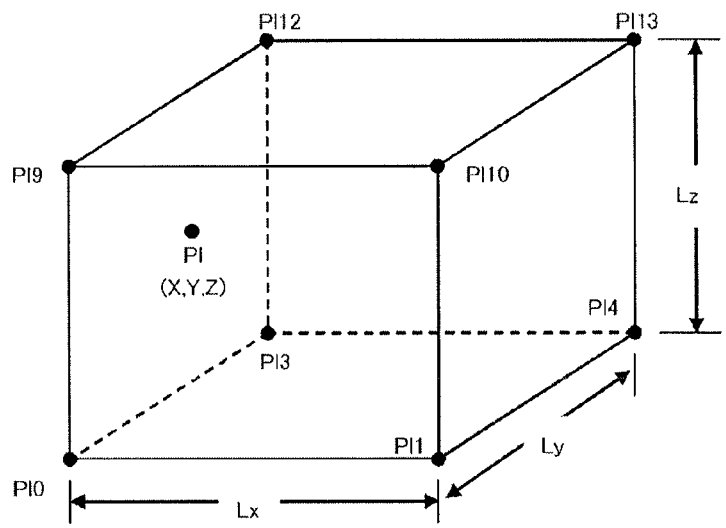
FIG. 11 is a diagram showing a lattice-like region including a command linear axis position Pl(X, Y, Z) in which the error amounts are to be calculated.

FIG. 11 is a diagram showing a lattice-like region including a command linear axis position Pl (X, Y, Z) in which the error amounts are to be calculated. In this example, the position Pl (X, Y, Z) in which the error amounts are to be calculated is located within a region surrounded by the lattice points Pl0, Pl1, Pl3, Pl4, Pl9, Pl10, Pl12 and Pl13. Lattice intervals along the X-, Y-, and Z-axes are given by Lx, Ly and Lz, respectively. Further, lattice point error vectors U0 (U0X, U0Y, U0Z, U0I, U0J, U0K) to U13 (U13X, U13Y, U13Z, U13I, U13J, U13K) are set on the lattice points Pl0, Pl1, Pl3, Pl4, Pl9, Pl10, Pl12 and Pl13. In the description to follow, this region is assumed to be a linear vector field to which the lattice point error vectors corresponding individually to the lattice points are given.

If the region including Pl (X, Y, Z) is obtained, lattice points Pl0 (Pl0$_X$, Pl0$_Y$, Pl0$_Z$) are defined as reference points. Then, a position within the lattice is normalized at [0, 1] to obtain the error amount at the point Pl. A coordinate value (x, y, z) at the normalized point Pl is determined according to the following equation (21):

$x=(X-Pl0x)/Lx,$ $y=(Y-Pl0y)/Ly,$ and $z=(Z-Pl0z)/Lz,$ \hfill (21)

where Lx, Ly and Lz are X-, Y-, and Z-axis lattice intervals, respectively.

Based on this coordinate value (x, y, z), error amounts (ϵXhl, ϵYhl, ϵZhl, ϵIhl, ϵJhl, ϵKhl) at the points Pl are obtained by the proportional distribution calculation of equation (22) as follows:

$$\varepsilon\alpha hl = U0\alpha*(1-x)(1-y)(1-z) + U1\alpha*x(1-y)(1-z) + \quad (22)$$
$$U4\alpha*xy(1-z) + U3\alpha*(1-x)y(1-z) + U9\alpha*(1-x)(1-y)z +$$
$$U10\alpha*x(1-y)z + U13\alpha*xyz + U12\alpha*(1-x)yz$$
$$(\text{where } \alpha = X, Y, Z, I, J, K).$$

Thus, the elements ϵXhl, ϵYhl and ϵZhl of 'Mhlt' and the elements ϵIhl, ϵJhl and ϵKhl of 'Mhlr' in the command linear axis position Pl(X, Y, Z) in which the tool head lies, that is, which depends on 'Pl', can be calculated. Based on these elements, the rotation error matrix Mhlr and translation error vector Mhlt that depend on the command linear axis position Pl in which the tool head lies are created, as indicated by the foregoing equations (5) and (7).

Figure 12:
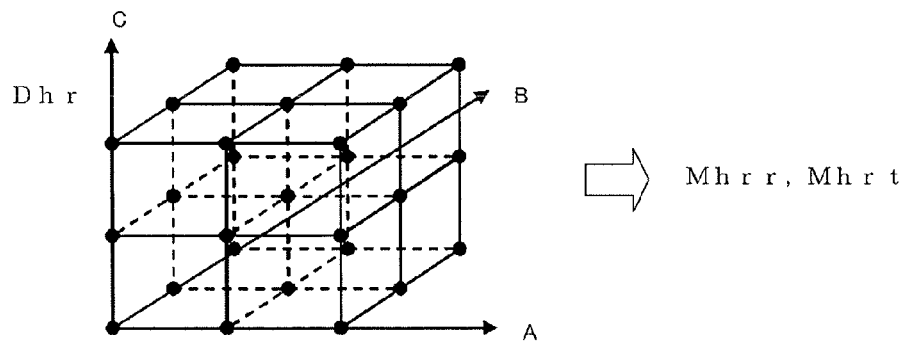
FIG. 12 is a diagram illustrating how error data Dhr of an ABC three-dimensional coordinate system and its derivative rotation error matrix Mhrr and translation error vector Mhrt are created.

Likewise, the rotation error matrix (Mhrr) and translation error vector (Mhrt) of the tool head that depend on the command rotary axis position Pr(A, B, C) for moving the tool head are obtained from error data Dhr of the three-dimensional coordinate system based on the A-, B-, and C-axes (see FIG. 12).

In the case of the tool-head-rotation type shown in FIG. 2, neither linear nor rotary axes are used to move the table, so that the rotation error matrix (Mtlr) and translation error vector (Mtlt), which depend on the linear axis position for moving the table, and the rotation error matrix (Mtrr) and translation error vector (Mtrt), which depend on the rotary axis position for moving the table, are unnecessary, and in calculation, are regarded as a unit matrix and a zero vector, respectively, as described above. Although an assumption has been made above that neither linear nor rotary axes are used to move the table, there may also be a multi-axis machine of the tool-head-rotation type having one or two linear axes for moving a table. As described later, in this case, the rotation error matrix (Mtlr) and translation error vector (Mtlt) that depend on the linear axis position for moving the table are obtained from the position of one or two linear axes for moving the table.

Figure 13:
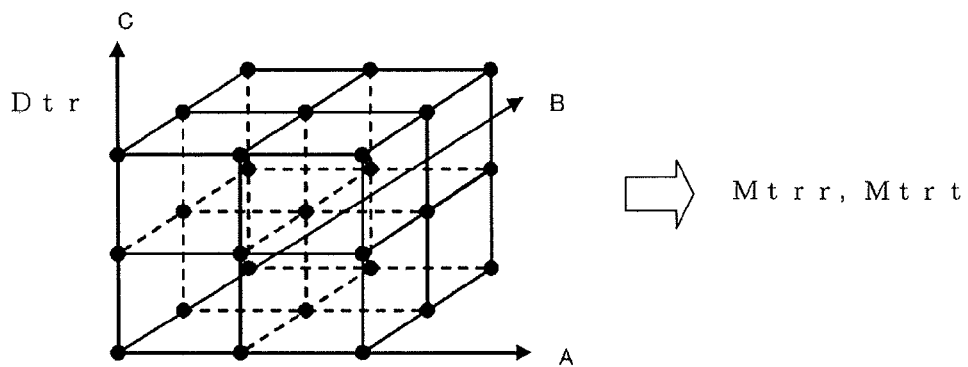
FIG. 13 is a diagram illustrating how error data Dtr of the ABC three-dimensional coordinate system and its derivative rotation error matrix Mtrr and translation error vector Mtrt are created.

Likewise, in the case of the table-rotation type shown in FIG. 5, the rotation error matrix (Mhlr) and translation error vector (Mhlt) of the tool head that depend on the command linear axis position Pl (X, Y, Z) for moving the tool head are obtained from the error data Dhl of the three-dimensional coordinate system based on the X-, Y-, and Z-axes (see FIG. 10). Likewise, moreover, the rotation error matrix (Mtrr) and translation error vector (Mtrt) of the table that depend on the command rotary axis position Pr (A, B, C) for moving the table are obtained from error data Dtr of the three-dimensional coordinate system based on the A-, B-, and C-axes (see FIG. 13).

In the case of the table-rotation type shown in FIG. 5, there is neither linear axes used to move the table nor rotary axes used to move the tool head, so that the rotation error matrix (Mtlr) and translation error vector (Mtlt), which depend on the linear axis position for moving the table, and the rotation error matrix (Mhrr) and translation error vector (Mhrt), which depend on the rotary axis position for moving the tool-head, are unnecessary, and in calculation, are regarded as a unit matrix and a zero vector, respectively, as described above. Although an assumption has been made above that neither linear nor rotary axes are used to move the table or tool head, there may also be a multi-axis machine of the table-rotation type having one or two linear axes for moving a table. As described later, in this case, the rotation error matrix (Mtlr)) and translation error vector (Mtlt) that depend on the linear axis position for moving the table are obtained from the position of one or two linear axes for moving the table.

Figure 14:
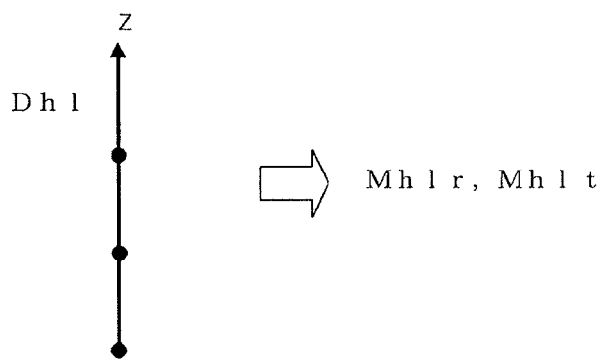
FIG. 14 is a diagram illustrating how error data Dhl of a one-dimensional coordinate system and its derivative rotation error matrix Mhlr and translation error vector Mhlt are created.
Figure 15:
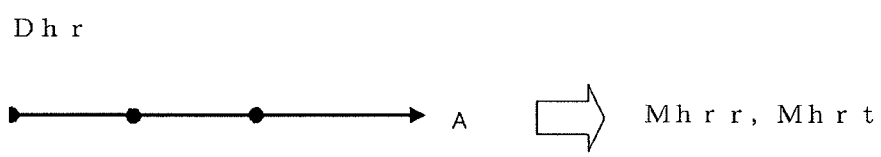
FIG. 15 is a diagram illustrating how error data Dhr of a one-dimensional coordinate system and its derivative rotation error matrix Mhrr and translation error vector Mhrt are created.
Figure 16:
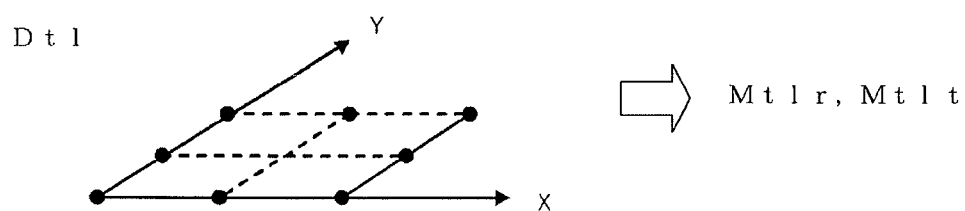
FIG. 16 is a diagram illustrating how error data Dtl of a two-dimensional coordinate system and its derivative rotation error matrix Mtlr and translation error vector Mtlt are created.

In the case of the mixed two-axis table type shown in FIG. 3, moreover, one command linear axis (Z-axis) is used to move the tool head, so that, considering that the error data Dhl is data on a Z-axis one-dimensional coordinate system, the rotation error matrix (Mhlr)) and translation error vector (Mhlt) of the tool head that depend on the linear axis position for moving the tool head are obtained from the Z-axis position, out of the command linear axis positions Pl(X, Y, Z) (see FIG. 14). Likewise, one command rotary axis (A-axis) is used to move the tool head, so that, considering that the error data Dhr is data on an A-axis one-dimensional coordinate system, the rotation error matrix (Mhrr) and translation error vector (Mhrt) of the tool head that depend on the rotary axis position for moving the tool head are obtained from the A-axis position, out of the command rotary axis positions Pr(A, B, C) (see FIG. 15). Further, two command linear axes (X- and Y-axes) are used to move the table, so that, considering that the error data Dtl is data on an XY two-dimensional coordinate system, the rotation error matrix (Mtlr) and translation error vector (Mtlt) of the table that depend on the linear axis position for moving the table are obtained from the X- and Y-axis positions, out of the command linear axis positions Pl(X, Y, Z) (see FIG. 16). Likewise, two command rotary axes (B- and C-axes) are used to move the table, so that, considering that the error data Dtr is data on a BC two-dimensional coordinate system, the rotation error matrix (Mtrr) and translation error vector (Mtrt) of the table that depend on the rotary axis position for moving the table are obtained from the B- and C-axis positions, out of the command rotary axis positions Pr(A, B, C) (see FIG. 17).

The one- and two-dimensional coordinate systems with lattice point error vectors including the Z-axis one-dimensional, A-axis one-dimensional, XY two-dimensional, and BC two-dimensional coordinate systems are described above. These one- and two-dimensional coordinate systems are obtained by deleting an unnecessary coordinate system or coordinate systems from the above-described three-dimensional coordinate system having lattice point error vectors (see FIG. 10). Calculation formulas for the error vectors may also be obtained by deleting elements associated with the unnecessary coordinate system(s) from the foregoing equations (21) and (22). How to obtain those calculation formula from the equations (21) and (22) is not specifically described herein, since it is self-evident.

In the case of the mixed two-axis tool head type shown in FIG. 4, furthermore, one command linear axis (Z-axis) is used Lu move the tool head, so that, considering that the error data Dhl is data on a Z-axis (one-dimensional) coordinate system, the rotation error matrix (Mhlr) and translation error vector (Mhlt) of the tool head that depend on the linear axis position for moving the tool head are obtained from the Z-axis position, out of the command linear axis positions Pl (X, Y, Z) (see FIG. 14). Likewise, two command rotary axes (A- and B-axes) are used to move the tool head, so that, considering that the error data Dhr is data on an AB two-dimensional coordinate system, the rotation error matrix (Mhrr) and translation error vector (Mhrt) of the tool head that depend on the rotary axis position for moving the tool head are obtained from the A- and B-axis positions, out of the command rotary axis positions Pr(A, B, C) (see FIG. 18). Further, two command linear axes (X- and Y-axes) are used to move the table, so that, considering that the error data Dtl is data on an XY two-dimensional coordinate system, the rotation error matrix (Mtlr) and translation error vector (Mtlt) of the table that depend on the linear axis position for moving the table are obtained from the X- and Y-axis positions, out of the command linear axis positions Pl (X, Y, Z) (see FIG. 16). Likewise, one command rotary axis (C-axis) is used to move the table, so that, considering that the error data Dtr is data on a C-axis (one-dimensional) coordinate system, the rotation error matrix (Mtrr) and translation error vector (Mtrt) of the table that depend on the rotary axis position for moving the table are obtained from the C-axis position, out of the command rotary axis positions Pr(A, B, C) (see FIG. 19).

Based on the machine configuration examples shown in FIGS. 2 to 5, the amounts of rotation and translation errors are obtained from the error data with the lattice point error vectors based on the lattice-like divisions of the one-, two-, and three-dimensional coordinate systems and the command linear and rotary axis positions. However, the machine configuration is not limited to these examples. Also in the cases of multi-axis machines of various other configurations, the rotation and translation error amounts of the command linear and rotary axis positions can be obtained from the nearest lattice point error vector in the one-, two-, or three-dimensional coordinate system relative to the command linear and rotary axis positions, according to the proportional distribution calculation, as shown in FIGS. (21) and (22). In this way, the rotation error matrices and translation error vectors of the tool head and table that depended on the command linear and rotary axis positions described in FIG. 8 can be obtained.

<Numerical Calculation Examples>

Numerical calculation examples are shown for the tool-head-rotation and table-rotation types. The rotation compensation amounts $\Delta Cr$ are indicated in degrees. These calculation examples also apply to the mixed two-axis tool head and table types.

(1) Tool-Head-Rotation Type

If the rotation and translation error amounts that depend on the linear axis position of the tool head, the rotation and translation error amounts that depend on the rotary axis position of the tool head, and the tool length compensation amount are given as shown in FIG. 20, based on the command linear and rotary axis positions Pl and Pr, in the multi-axis machine of the tool-head-rotation type of FIG. 2, the rotation and translation compensation amounts $\Delta Cr$ and $\Delta Ct$ mentioned in the compensation column of FIG. 20 are calculated according to equations (1) to (19). The rotation compensation amounts $\Delta Cr$ are assumed to be a solution that leads to the minimal Dn described in equation (16). This also applies to the following calculation example.

(2) Table-Rotation Type

If the rotation and translation error amounts that depend on the linear axis position of the tool head, the rotation and translation error amounts that depend on the rotary axis position of the table, and the tool length compensation amount are given as shown in FIG. 21, based on the command linear and rotary axis positions Pl and Pr, in the multi-axis machine of the table-rotation type of FIG. 5, the rotation and translation compensation amounts $\Delta Cr$ and $\Delta Ct$ mentioned in the compensation column of FIG. 21 are calculated according to equations (1) to (19).

<Block Diagram>

Figure 22:
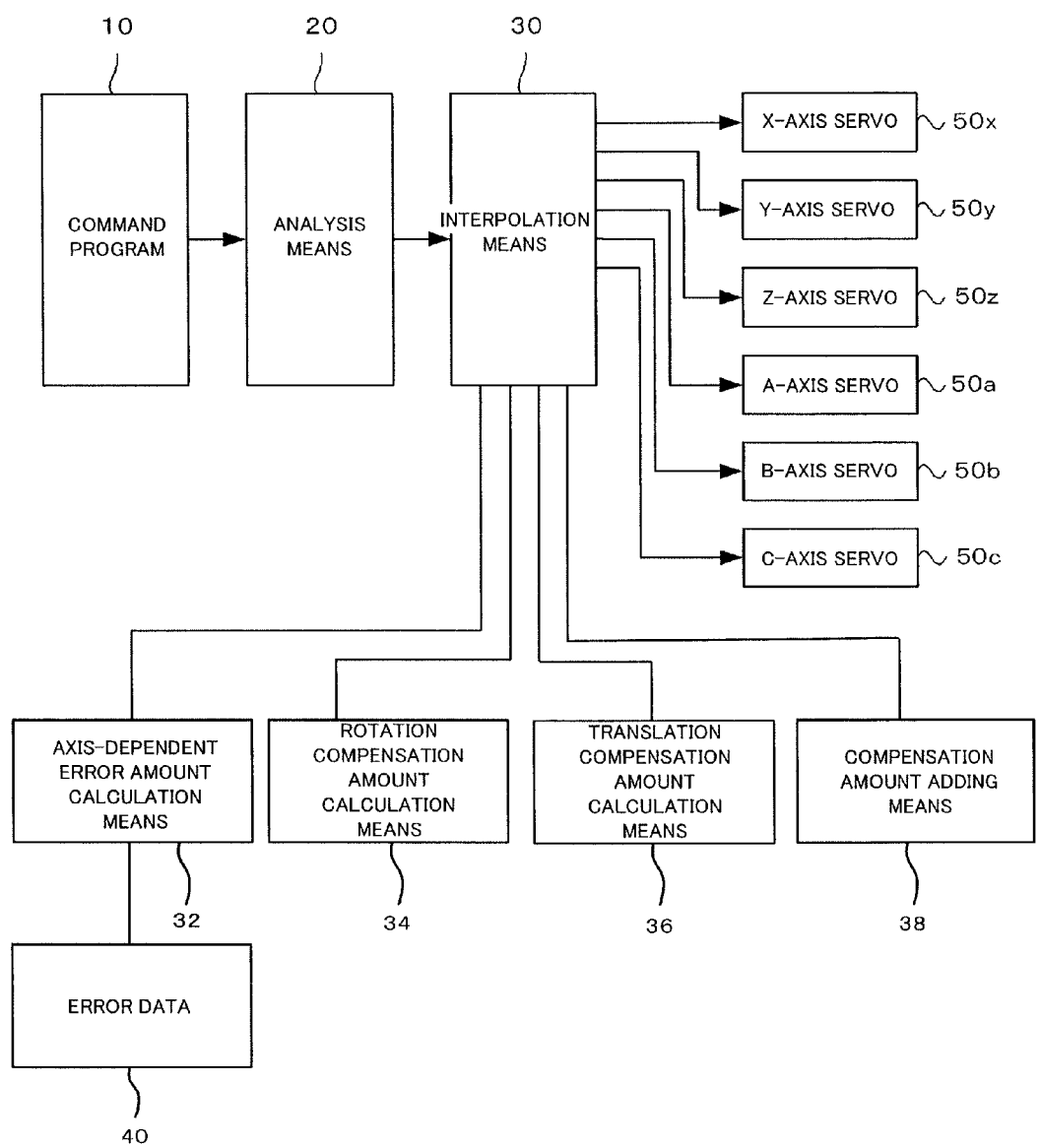
FIG. 22 is a block diagram illustrating a numerical controller for a multi-axis machine according to the present invention.

As shown in FIG. 22, a numerical controller is configured so that a command program 10 is analyzed by analysis means 20 and interpolated by interpolation means 30, and servos 50x, 50y, 50z, 50a, 50b and 50c for the individual axes are driven. Axis-dependent error amount calculation means 32, rotation compensation amount calculation means 34, translation compensation amount calculation means 36, and compensation amount adding means 38 that constitute the numerical controller according to the present invention belong to the interpolation means 30, as shown in FIG. 22. The axis-dependent error amount calculation means 32 uses error data 40 to calculate axis-dependent error amounts.

<Flowchart>

Figure 23:
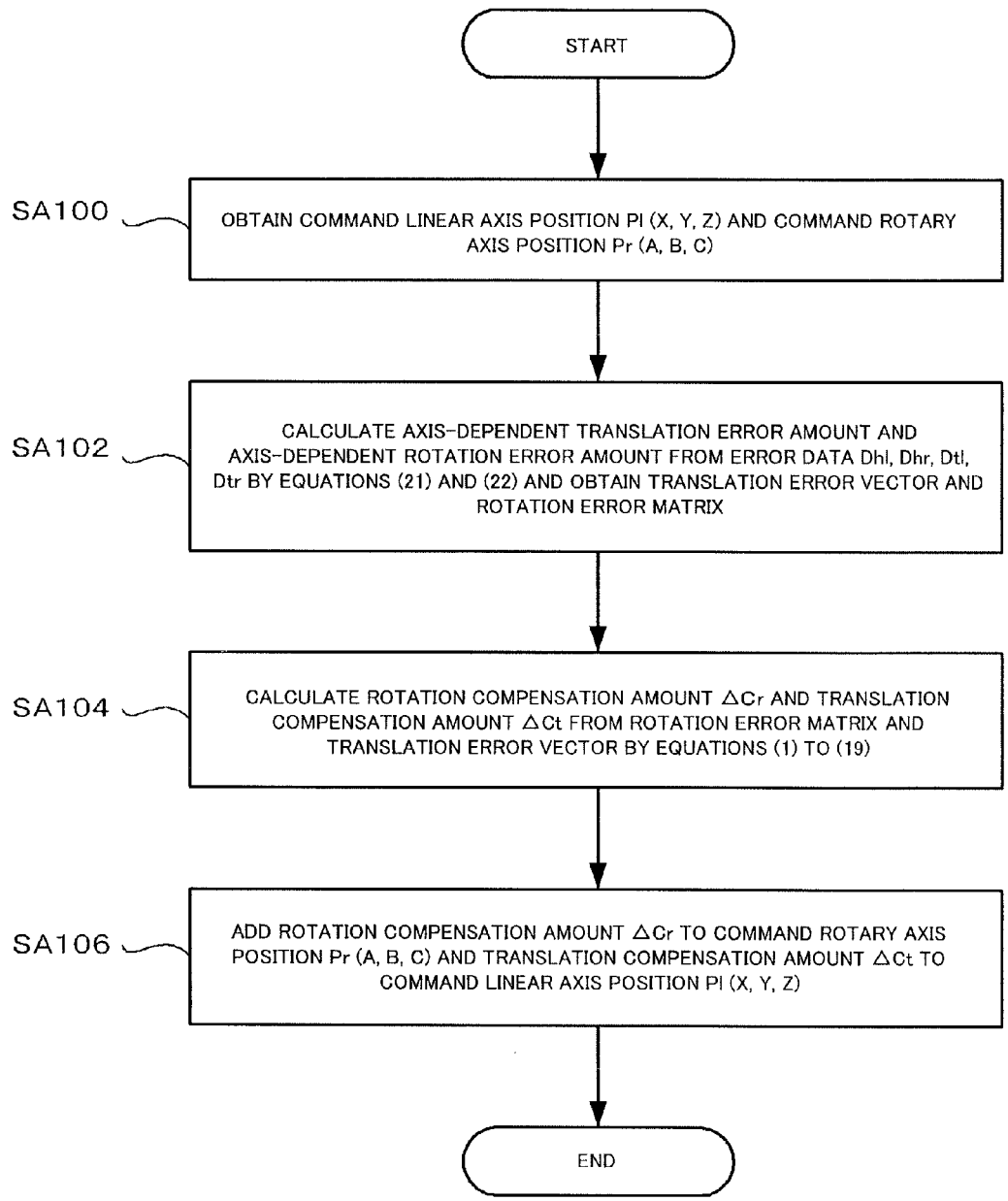
FIG. 23 is a flowchart showing an algorithm of processing performed by the numerical controller of the invention.

FIG. 23 is a flowchart showing an algorithm of processing performed by the numerical controller according to the present invention. In this flowchart, Steps SA100 and SA102 correspond to the axis-dependent error amount calculation means 32, Step SA104 corresponds to the rotation and translation compensation amount calculation means 34 and 36, and Step SA106 corresponds to the compensation amount adding means 38.

The invention claimed is:

1. A numerical controller for controlling a multi-axis machine which uses at least three linear axes and three rotary axes to machine a workpiece mounted on a table, the numerical controller comprising:
   axis-dependent error amount calculation means for calculating an axis-dependent translation error amount and an axis-dependent rotation error amount based on a command axis position;
   translation compensation amount calculation means for calculating a translation compensation amount based on the axis-dependent translation error amount;
   rotation compensation amount calculation means for calculating a rotation compensation amount based on the axis-dependent rotation error amount;
   compensation amount adding means for adding the translation compensation amount to a command linear axis position and adding the rotation compensation amount to a command rotary axis position; and
   means for driving the three linear axes and the three rotary axes to a position calculated by the compensation amount adding means.

2. The numerical controller according to claim 1, wherein the axis-dependent error amount calculation means calculates a rotary-axis-dependent translation error amount and a rotary-axis-dependent rotation error amount as the axis-dependent translation error amount and the axis-dependent rotation error amount, respectively, based on the command rotary axis position,
   the translation compensation amount calculation means calculates the translation compensation amount based on the rotary-axis-dependent translation error amount, and
   the rotation compensation amount calculation means calculates the rotation compensation amount based on the rotary-axis-dependent rotation error amount.

3. The numerical controller according to claim 1, wherein the axis-dependent error amount calculation means calculates a linear-axis-dependent translation error amount and a linear-axis-dependent rotation error amount as the axis-dependent translation error amount and the axis-dependent rotation error amount, respectively, based on the command linear axis position,
   the translation compensation amount calculation means calculates the translation compensation amount based on the linear-axis-dependent translation error amount, and
   the rotation compensation amount calculation means calculates the rotation compensation amount based on the linear-axis-dependent rotation error amount.

4. The numerical controller according to claim 1, wherein the axis-dependent error amount calculation means calculates a linear-axis-dependent translation error amount and a linear-axis-dependent rotation error amount, based on the command linear axis position, and calculates a rotary-axis-dependent translation error amount and a rotary-axis-dependent rotation error amount, based on the command rotary axis position, as the axis-dependent translation error amount and the axis-dependent rotation error amount, respectively,
   the translation compensation amount calculation means calculates the translation compensation amount based on the linear-axis-dependent translation error amount and the rotary-axis-dependent translation error amount, and
   the rotation compensation amount calculation means calculates the rotation compensation amount based on the linear-axis-dependent rotation error amount and the rotary-axis-dependent rotation error amount.

5. The numerical controller according to claim 1, wherein the rotation compensation amount is obtained as a rotary axis compensation amount for rotation compensation of an actual tool length compensation vector having a rotation error with respect to a tool length compensation vector.

6. The numerical controller according to claim 1, wherein the translation compensation amount is obtained as a translation compensation amount with respect to a tool reference point vector representing a tool reference point on a table coordinate system.

7. The numerical controller according to claim 2, wherein the multi-axis machine uses at least three linear axes and three rotary axes for tool head rotation to machine the workpiece mounted on the table, and
   the rotary-axis-dependent translation and rotation error amounts are translation and rotation error amounts for the three rotary axes for tool head rotation.

8. The numerical controller according to claim 1, wherein the multi-axis machine uses a L least three linear axes, one rotary axis for tool head rotation, and two rotary axes for table rotation to machine the workpiece mounted on the table, and
   the rotary-axis-dependent translation and rotation error amounts are translation and rotation error amounts for the one rotary axis for tool head rotation and translation and rotation error amounts for the two rotary axes for table rotation.

9. The numerical controller according to claim 1, wherein the multi-axis machine uses at least three linear axes, two rotary axes for tool head rotation, and one rotary axis for table rotation to machine the workpiece mounted on the table, and
   the rotary-axis-dependent translation and rotation error amounts are translation and rotation error amounts for the two rotary axes for tool head rotation and translation and rotation error amounts for the one rotary axis for table rotation.

10. The numerical controller according to claim 1, wherein the multi-axis machine uses at least three linear axes and three rotary axes for table rotation to machine the workpiece mounted on the table, and
   the rotary-axis-dependent translation and rotation error amounts are translation and rotation error amounts for the three rotary axes for table rotation.

* * * * *